United States Patent [19]
Gohara et al.

[11] Patent Number: 6,036,756
[45] Date of Patent: Mar. 14, 2000

[54] RETROFIT OF A CENTER INLET TYPE SCRUBBER WITH ABSORPTION/GAS DISTRIBUTION TRAY TO IMPROVE GAS-LIQUID CONTACT IN THE ABSORPTION ZONE

[75] Inventors: Wadie F. Gohara, Barberton; Norman D. Nelson, Akron, both of Ohio

[73] Assignee: The Babcock & Wilcox Company, New Orleans, La.

[21] Appl. No.: 09/006,376

[22] Filed: Jan. 13, 1998

[51] Int. Cl.⁷ .......................... B01D 47/06; B01D 47/10; B01D 47/14

[52] U.S. Cl. ............................ 96/297; 96/326; 96/370; 95/224; 261/109; 261/113; 261/117; 261/DIG. 9; 261/DIG. 54; 55/413; 55/418

[58] Field of Search ..................... 261/109, 113, 261/116, 117, DIG. 54, DIG. 56, DIG. 9; 96/296, 297, 366, 370, 322, 326, 271, 272, 273; 95/223, 224; 55/418, 413

[56] References Cited

U.S. PATENT DOCUMENTS

| | | | |
|---|---|---|---|
| 1,948,980 | 2/1934 | Coffey | 261/117 |
| 2,542,681 | 2/1951 | Kinney et al. | 261/DIG. 9 |
| 3,793,809 | 2/1974 | Tomany et al. | 261/DIG. 54 |
| 4,110,088 | 8/1978 | Cold et al. | 95/224 |
| 5,246,471 | 9/1993 | Bhat et al. | 261/113 |

*Primary Examiner*—David A. Simmons
*Assistant Examiner*—Robert A. Hopkins
*Attorney, Agent, or Firm*—Robert J. Edwards; Daniel S. Kalka

[57] ABSTRACT

An improvement in a center inlet type scrubber that retrofit the scrubber with a perforated tray made up of rectangular or partially rectangular sections supported on beam supports in the annulus of the scrubber. The supports can be modified to form turning vanes or additional turning vanes can be employed. One or more perforated trays may be installed in the annulus to help correct the problem.

21 Claims, 15 Drawing Sheets

RETROFIT OF A CENTER INLET TYPE SCRUBBER WITH ABSORPTION/GAS DISTRIBUTION TRAY TO IMPROVE GAS-LIQUID CONTACT IN THE ABSORPTION ZONE

BACKGROUND OF THE INVENTION

1. Field of the Invention

The present invention relates in general to gas scrubbers, and in particular to an improvement for center inlet type scrubbers.

2. Description of the Related Art

Several types of gas scrubbers are known in the FGD (flue gas deulfurization) industry. A detailed discussion of FGD construction and use can be found in STEAM, 40th Edition, Babcock & Wilcox Company, Chapter 35. Center inlet type scrubbers have a unique design as shown in FIG. 1. The scrubber shown in FIG. 1 consists of two concentric structures. The outer structure contains spray headers 12 delivering the scrubbing solution and may contain one or two stages of mist elimination devices 30. In some cases, one or both stages of the mist elimination device 30, are located in the outlet flue 14. The inner center structure consists of the inlet flue 16, a venturi section 18 used to quench the gas and separate ash particles from the gas stream, and a downcomer 20 to deliver the gas downwardly under the level of the sprays. A plumb bob 22 is used to control and accelerate the entering gas to insure maximum particulate separation.

The entering gas is quenched in the venturi section 18 located above the downcomer. The gas flow rate and efficiency of particulate separation is controlled by the plumb bob position and the pressure drop across the plumb bob 22. In the inlet downcomer 20, the cleaned and quenched gas travels downwardly with the quenching/scrubbing solution. At the bottom of the downcomer 28, the quenching/ash collecting solution drops into an integral tank 24 or a device directing this stream into a separate tank. The gas makes a 180° turn and travels upwardly in a countercurrent direction towards the flow of the spray headers 12. In the outer annulus 26 of the scrubber, several levels of sprays are located midway between the bottom 28 of the downcomer and the absorber outlet 14. Each spray header contains one or more nozzles that sprays the scrubbing solution or slurry which is normally alkaline counter to the gas flow. The scrubbed gas exits through the scrubber outlet 14 located at one side of the outer annulus 26. Mist is removed from the cleaned gas in one or more stages of mist elimination device 30.

The mist elimination device(s) may be located horizontally in the vertical section of the outer annulus 26, or may be located vertically in the scrubber outlet 14. The configuration of the scrubber, the 180° turn at the bottom of the downcomer, and the location of the gas outlet promote gas maldistribution in the outer annulus 26. A typical gas velocity profile for this type of scrubber is shown in FIG. 2 with gas velocities being in feet per second.

The main disadvantage of the prior art system is the poor gas distribution in the spray section. The entering gas leaves the bottom 28 of the downcomer at a velocity in excess of 50 to 90 feet per second making an unguided 180° turn. The combined effect of the high gas velocity, the turn, the location of the outlet, and the lack of guiding devices, such as gas turning vanes, at the bottom of the outer annulus forces the gas towards the outer walls of the annulus and in the direction of the outlet. Poor gas distribution leads to excessive localized velocity zones near the outer walls, gas recirculation, poor gas liquid contact, and poor removal efficiency for a given scrubbing liquid flow rate. The poor gas distribution and the localized high velocity pockets are passed on to the mist elimination devices leading to failure in their performance and/or uneven solids deposits on the surface of the mist eliminator 30. This uneven flow through the mist eliminator 30, leads to pluggage of the low liquid flow zones which leads to even higher gas velocity, and increased potential for faster failure and liquid droplets carryover to the stack.

The addition of turning vanes or other gas distribution devices in the outer annulus at the bottom of the downcomer, such as guiding, or turning vanes may correct the gas distribution problem, however, the use of scrubbing slurry and contamination of the slurry with the removed ash presents a potential for partial solid build-up on the vane and eventual total pluggage of the gas flow area. Such a solution to this problem is viable only if the scrubbing solution is clear, and the products of the scrubbing process are highly soluble in the scrubbing liquor to prevent solids deposition.

The use of pie shaped trays to correct gas maldistribution has the potential to aggravate the problem because the pie shaped tray sections are wide near the outside of the annulus where gas flow area need to be restricted, and narrow near the downcomer where a bigger flow area is necessary to promote greater gas flow. Also, each pie shaped tray section requires two supports spanning the radius of the annulus from the outer wall to the downcomer. The proximity of the supports near the downcomer also contribute to the restriction of the flow area near the downcomer.

Another option is employed in the present invention. This is to place a perforated tray at the bottom of the downcomer to affect gas distribution as the gas turns at the bottom of the annulus, and improve pollutants removal by the following methods:

- Providing even and optimum gas/liquid proportions at and above the perforated tray;
- Allowing longer contact time between the gas and the liquid, because the perforated tray acts as a contacting surface, as well as a gas distribution device;
- Acting as a storage bin for the liquid draining from the tray to the tank underneath, therefore, promoting cleaning of the structures under the tray;
- Straightening the gas flow upstream of the spray banks and providing maximum utilization of the scrubbing reagent;
- Locating the perforated tray at a proper distance from the lowest spray bank to avoid impingement of the spray on the tray and minimize erosion of the tray material;
- Locating the perforated tray at a proper distance from the lowest spray bank to insure that the spray is well developed before it is interrupted by any structures; and
- Building the tray sections of rectangular or non pie shaped geometric structures to maximize the flow area near the downcomer and minimize the tray section supports.

SUMMARY OF THE INVENTION

To correct the existing problem of gas maldistribution shown in FIG. 2, the gas turning at the bottom of the downcomer is evenly distributed across the outer annulus flow area as the gas makes the turn. Proper redistribution of the gas before it reaches the sprayed slurry leads to an even liquid-to-gas ratio, and proper contact between the gas and liquid.

The objective of this invention is to provide means to retrofit center inlet scrubbers as described above or of similar design with a perforated plate or tray without excessive rework of the existing vessel, without excessive obstruction of the critical flow area with supports, and with the potential to manipulate the resistance near the downcomer walls.

According to the present invention a perforated tray is located at the bottom end of the annulus at or near the bottom of the downcomer. The downcomer may need to be extended to avoid impingement of the spray on the tray which causes erosion of the tray material, or causes the spray to collapse before it is fully developed. If the distance between the lower spray header and the bottom of the downcomer is adequate, then the extension is not necessary and the tray supports and sections are attached directly to the downcomer or downcomer bottom end. The distance between the lowest spray bank and the tray, or tray baffles, varies from about 18 inches to as much as about 5 feet, depending on the type of nozzles, the spray pattern in the scrubber, and the direction of the sprayed slurry. The principles of this invention are also applicable in cases where the spray headers are spraying co-current to the upwardly rising gas flow in the outer annulus.

Perforated trays are supported from rings attached to the outer wall of the annulus and the downcomer, or from the bottom of the downcomer extension. One distinction of the invention is that the perforated tray sections are preferably rectangular or other geometric shape other than pie shaped. This approach was adopted to minimize the support steel material associated with the pie shaped tray sections, and to provide maximum open flow area near the outside of the downcomer where gas flow is lacking and is mostly needed in this area of the scrubbing zone.

Another advantage to this structure is minimum waste of the perforated tray material, in manufacturing, since the tray sections are rectangular rather than pie shaped. The cut off sections from the outer perimeter tray sections can also be used to fill the uneven sections of the downcomer's outer perimeter.

To minimize the effect of the scrubber's side outlet on gas distribution, the tray support is oriented to compensate for the resulting low resistance to the gas flow. Baffles located on top of the tray segment form the tray sections into compartments and restrict the side to side motion of the liquid accumulating on top of the tray sections. This helps to retain a liquid layer in each section and provides controlled resistance to the gas flow particularly when various open area tray sections are used. Baffles or vanes located under the perforated tray also help with support orientation in guiding the upward flow of the gas.

The gas redistribution by the perforated tray may also be assisted by varying the open area of the tray in different locations of each section, or in an entire section, to force the gas to follow the path of least resistance. The location of the variable area sections of the tray are determined by modeling, physical or numerical, or with best engineering judgement. In other cases, a uniform open area tray may be adequate. This decision is made after proper modeling of the scrubber.

While one embodiment of the invention has two main support beams under the perforated tray, on similar or larger diameter scrubbers two or more additional beams may be located perpendicular to these beams in other embodiments.

In cases where tighter control over gas distribution is required, the support may be designed to act as turning vanes extending under the perforated tray or additional turning vanes may be added under the tray between the support beams. The extensive and evenly flowing liquid drainage from the perforated tray keeps the support beams/gas turning vanes clean and free of solids build up.

Two stages of horizontal gas flow mist eliminators are located in the outlet flue. In addition to the retrofit described above, a set of guiding plates or turning vanes may be located above the top spray header to help even the gas distribution through the turn to the side outlet. The position and shape of these plates are a function of the operating gas velocity in the outer annulus and the absorber outlet location.

At a lower gas velocity, the carry up from the spray bank is minimal. Continuous or intermittent wash from the make up water system may be required to keep the upper gas turning devices clean. At a gas velocity equal to or greater than about 12 feet per second, the liquid carry up from the sprays below is heavy enough to wash any deposited solids and keep the plates clean.

The various features of novelty which characterize the invention are pointed out with particularity in the claims annexed to and forming a part of the disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
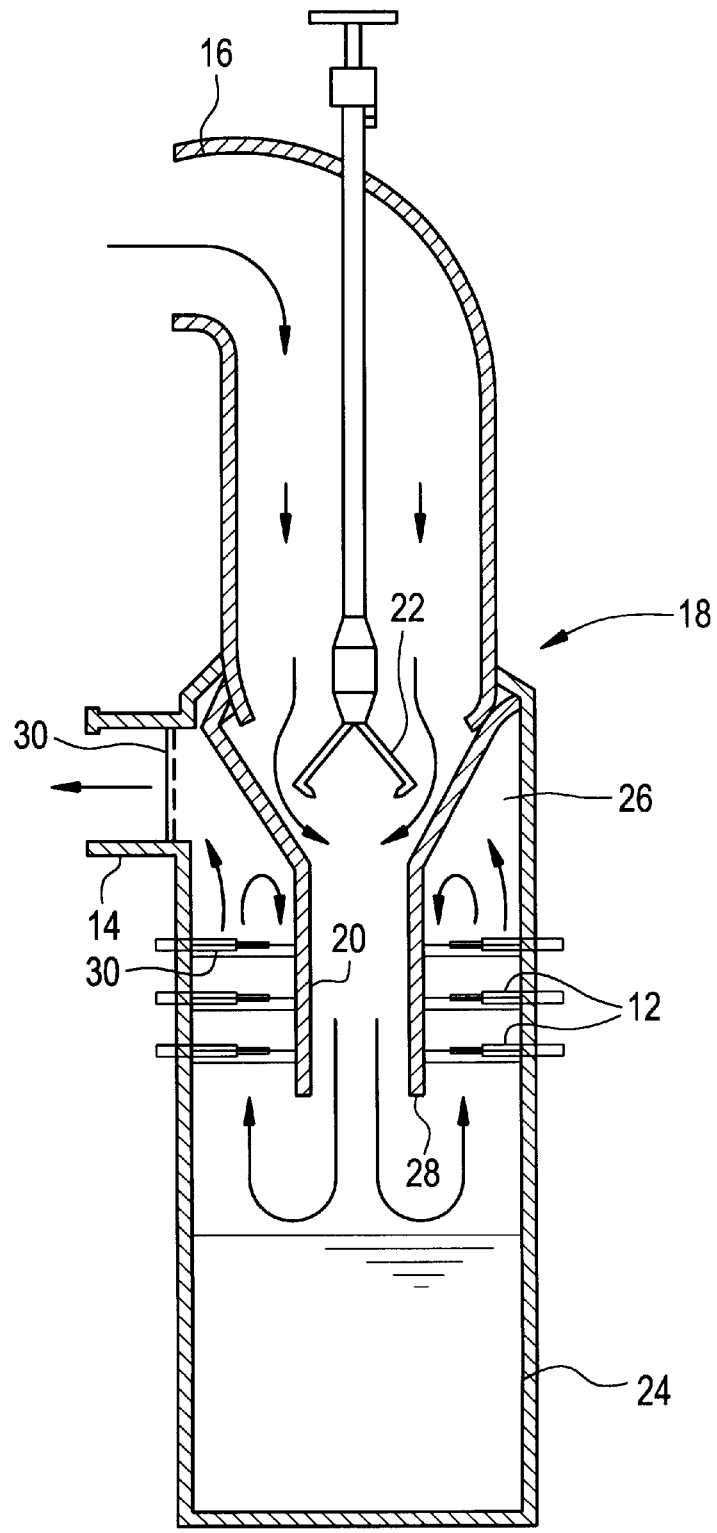
FIG. 1 is a schematic side sectional view of a scrubber according to the prior art.
Figure 2:
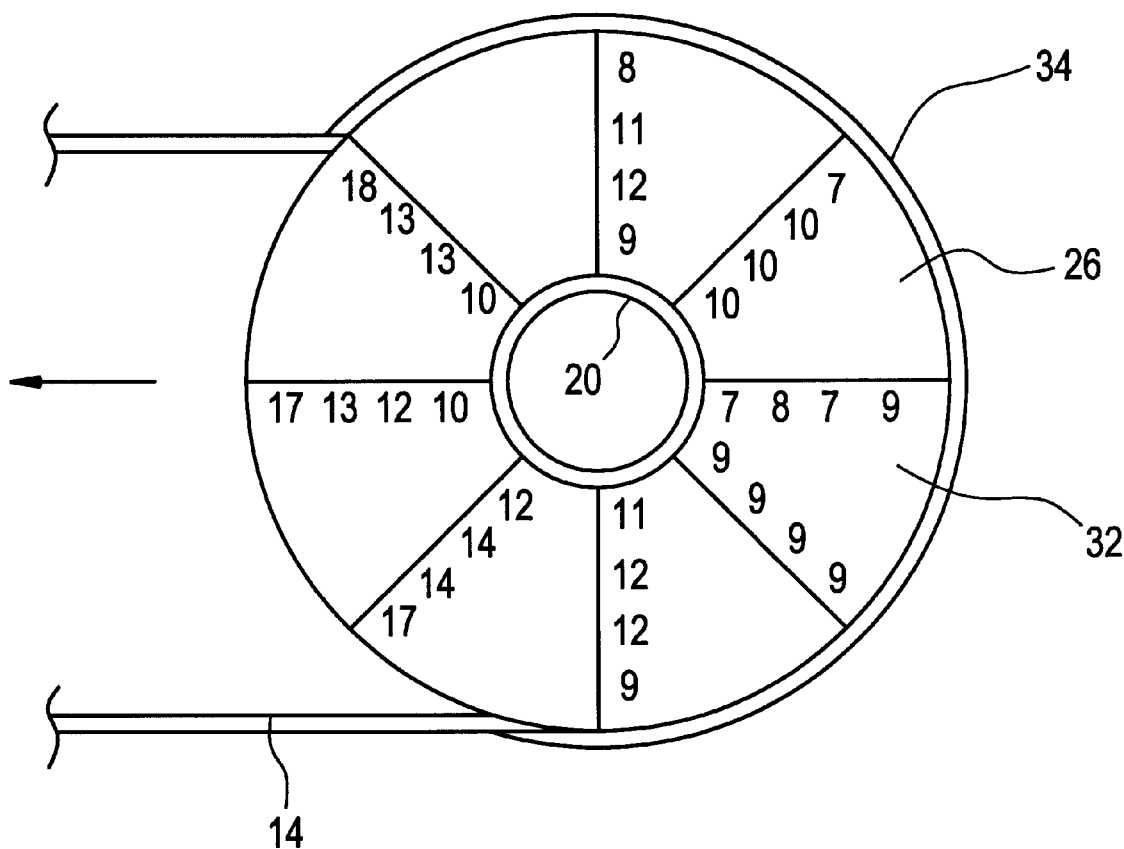
FIG. 2 is a horizontal sectional view of the annulus of prior art scrubber illustrating the velocity profile therein.

Referring to the drawing and first to FIGS. 1 and 2 in particular, the invention is an improvement over the known scrubber structure of FIG. 1. It improves the prior art velocity profile across the outer annulus of the scrubber. The velocity profile is shown in FIG. 2 where the numerals superimposed on the annulus flow area pie shaped represent the gas velocity measured in the annulus in feet per second.

Throughout the drawings, the same reference numerals are used to designate the same, or functionally similar parts.

Figure 3:
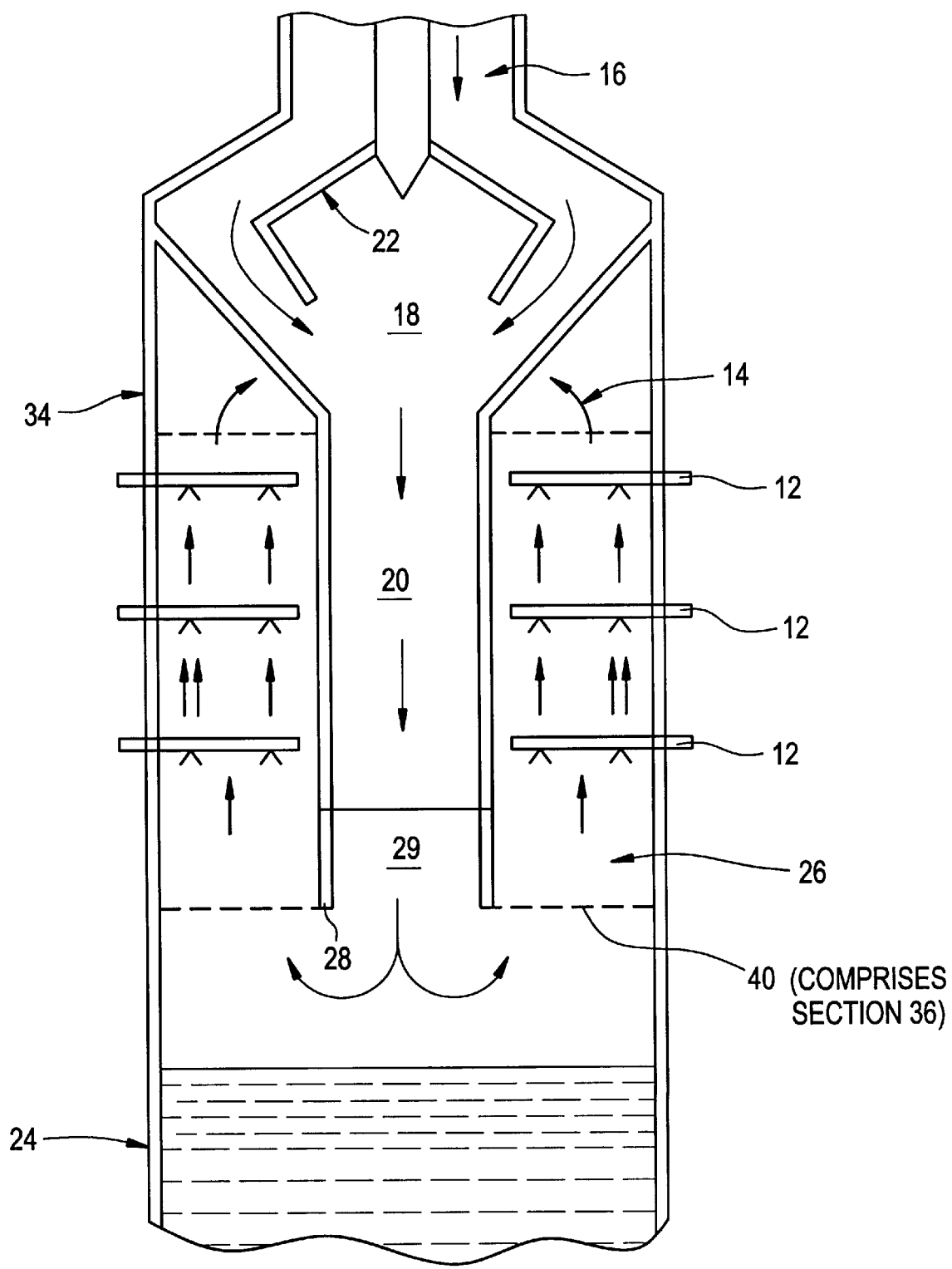
FIG. 3 is a partial side sectional view of a central inlet type scrubber according to the present invention.

In FIG. 3, the scrubber of the present invention comprises a cylindrical enclosure 34 enclosing an upper center inlet 16 with a venturi section 18, which is only shown schematically. A center inlet downcomer 20, extends downwardly from the venturi section 18 and ends at the bottom end 28, which may be the bottom of the unextended downcomer 20, or may be the bottom end of the downcomer extension 29. The bottom end of the downcomer, or the bottom of the extension 29 brings the lower end 28 of downcomer 20, an adequate distance below the lowest spray header 12 in the annulus 26. A perforated tray 40, the subject of this invention, is located at the lower end of the downcomer 28, or the bottom of the extension 29. The perforated tray 40 consists of baffled sections 36 and extends around the bottom of the annulus and serves to even the gas distribution. The gas flows under the lower end 28, passes through the perforated tray 40, and begins to ascend up the annulus in the direction of the curved arrow. Extension 29 is selected to extend the lower end of the downcomer 20 by a distance of about 18 inches to about 5 feet below the lowest spray bank 12 in the annulus 26. Supports for the perforated tray 40 are attached to the outer wall 34 and are also supported off the walls of the downcomer 20, or by the lower end 28 of the downcomer 20, or the downcomer extension 29, if an extension is required to satisfy the 18 inches to 5 feet design criteria. As a result of the even gas distribution ascending in the annulus, the liquid to gas ratio is optimized and the scrubbing efficiency of the system is improved.

Figure 4:
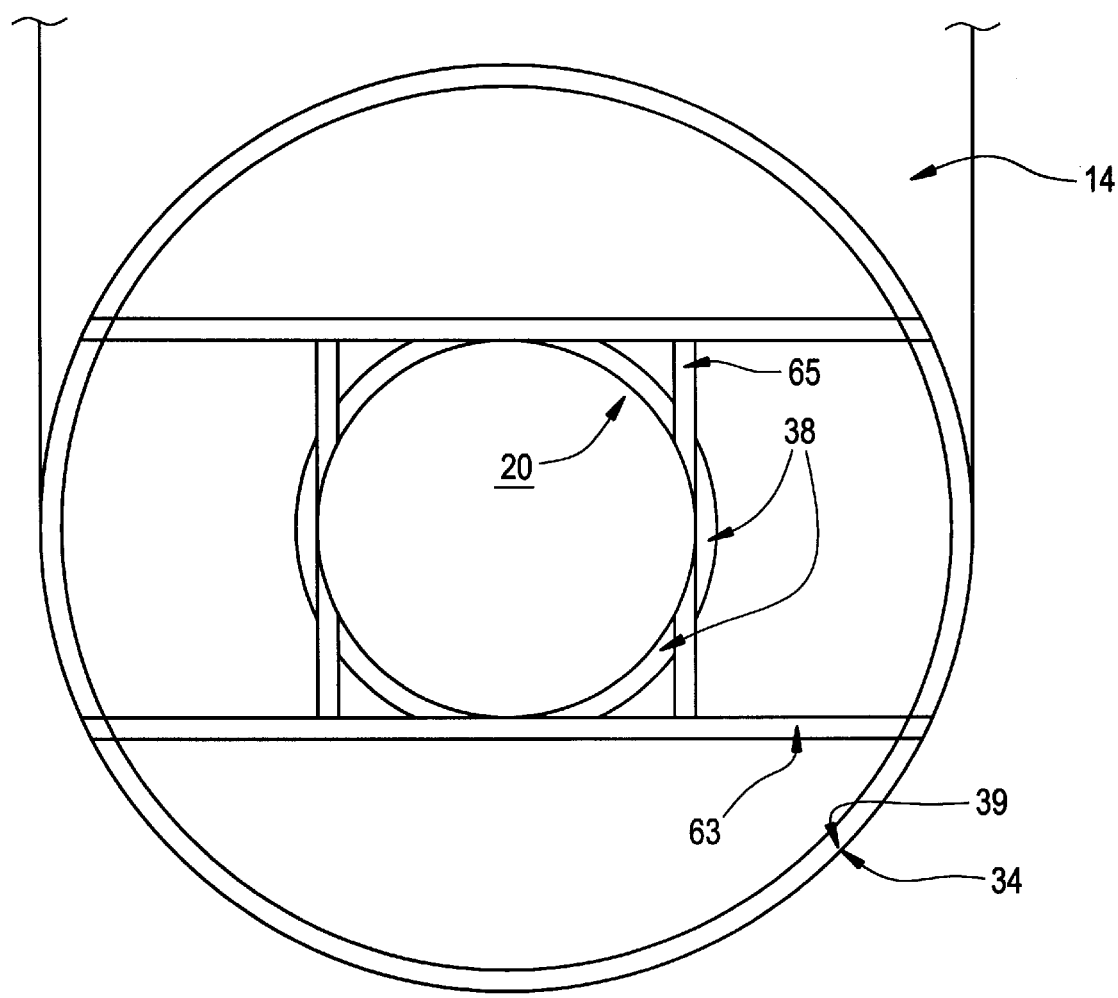
FIG. 4 is a top view of the present invention showing the tray main supports, and the support bars.
Figure 5:
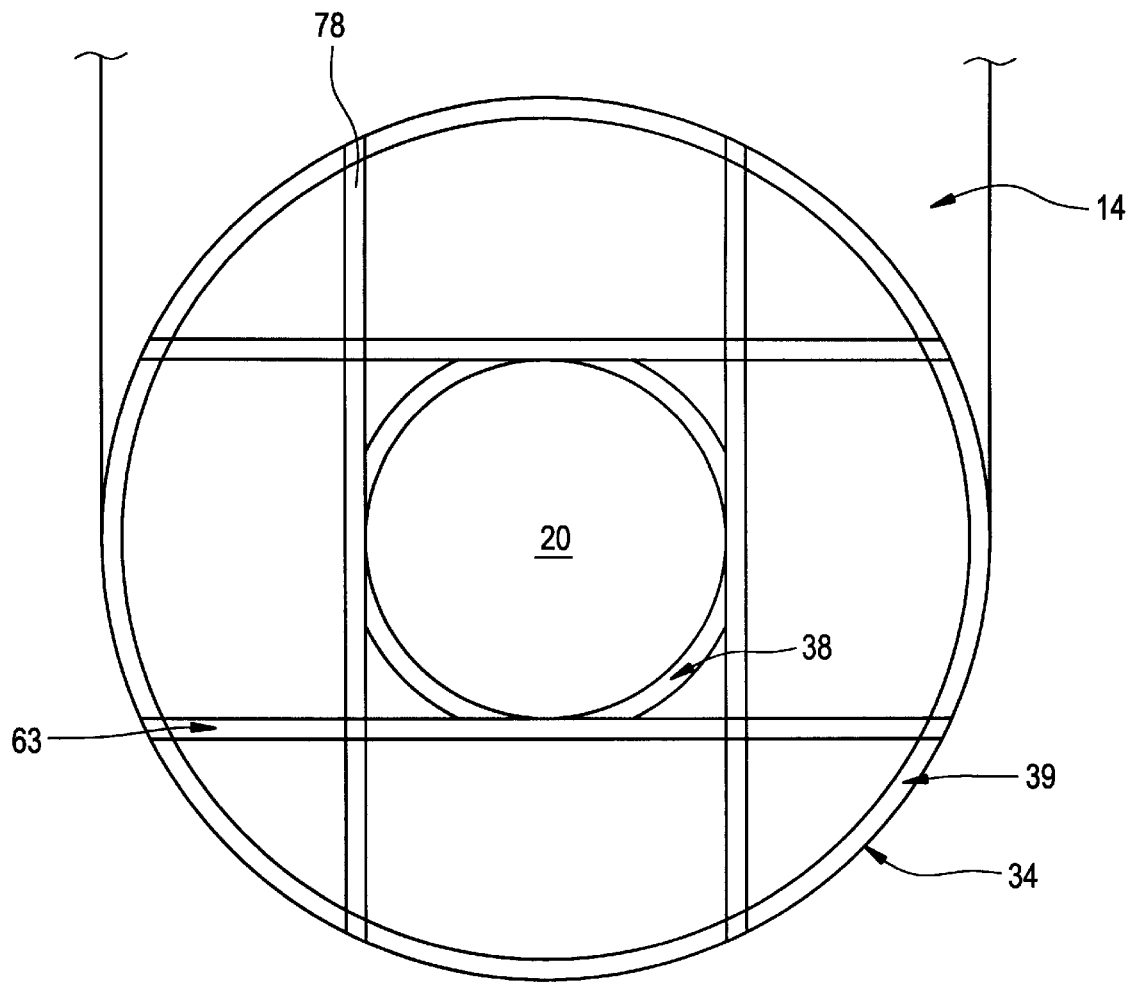
FIG. 5 is a top view of the present invention showing an alternate tray main support structure.

FIG. 4 shows the support structure of the perforated tray. A ring bar 38 attached to the outer walls of the downcomer 20, or to the lower end of the downcomer 28, or to the extension to the downcomer 29, supports the inner ends of the tray sections 36 located between the main support beams 63. An outer ring 39 attached to the outer wall of the annulus 34 supports the other end of the tray sections 36. Support beams 63 are attached to the outer annulus wall 34 and are also supported off the downcomer 20, or the bottom of the downcomer 28, or attached to the bottom of the downcomer extension 29. Main support beams 63 are also connected to the trays sections 36 by way of either being mounted above, or preferably below the trays. Support bars 65 typically located between the support 63 and the downcomer 20, or the downcomer extension 29 act as span breakers and provide added support for the long tray sections 36a shown in FIG. 6. The added support provide added protection for personnel and equipment using the tray 40 as a platform for inspection during maintenance. FIG. 5 shows an alternate support system arrangement in which support beams 78 are positioned perpendicular to the outlet flue in addition to support beams 63 for better control of gas partition and distribution.

Figure 6:
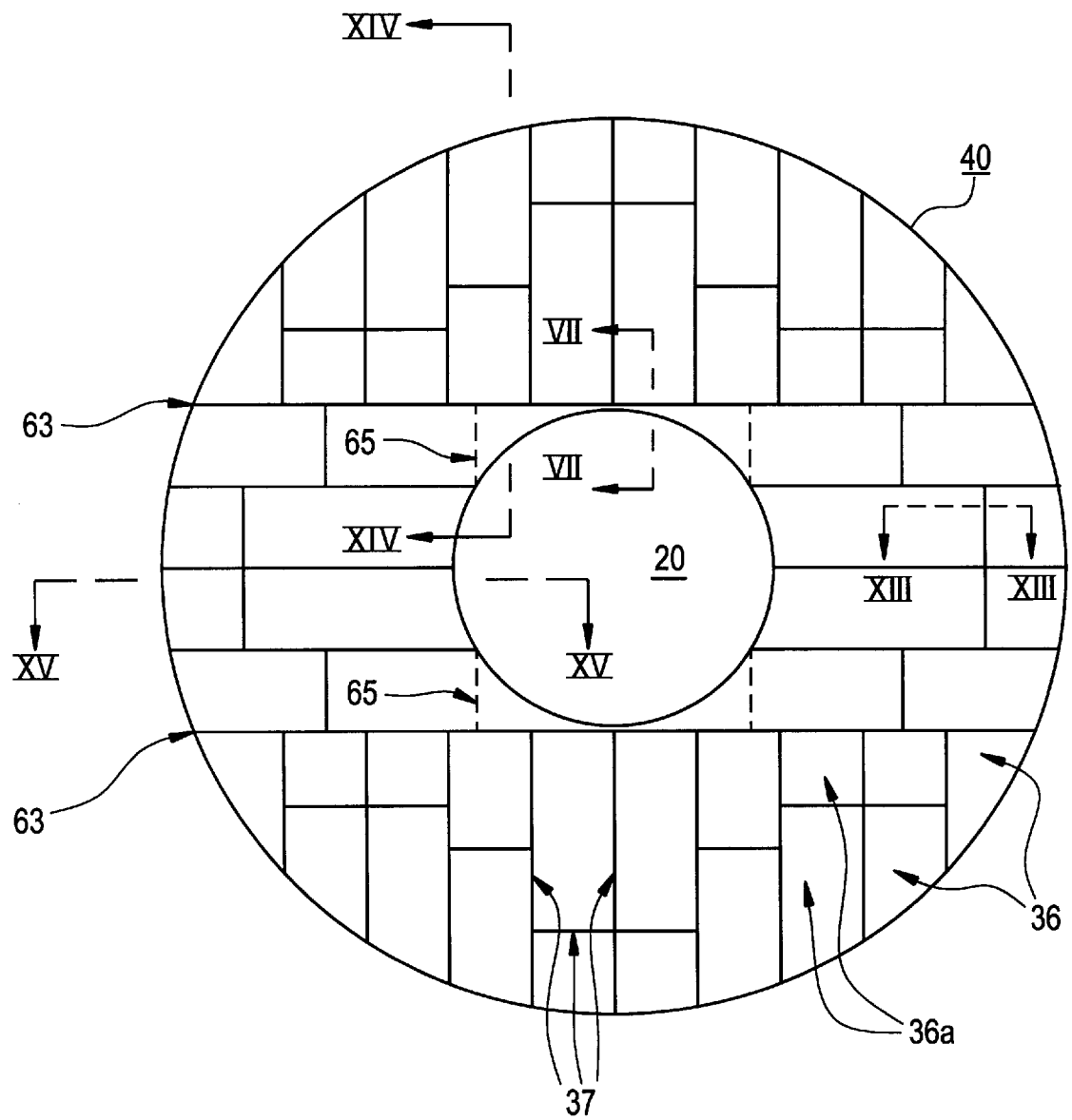
FIG. 6 is a cross section across the tray 40 showing the various parts of the tray.

Turning next to FIG. 6, the perforated tray 40 is preferably made up of multiple rectangular, or other geometric shaped sections 36, other than pie shaped sections. Portions which are cut off from the rectangular tray sections fitted against the outer walls of the annulus 34 can be used to fill in the inner perimeter of the scrubber cross section around the outside walls of the downcomer. FIG. 6 also shows the location of the main support beams 63 spanning across the outer annulus 34 and attached to the downcomer 20, the bottom of the downcomer 28, or the bottom of the extension 29. Support bars 65 span between the main support 63 and the downcomer wall to break the span of the long tray sections 36a. The tray sections 36 are compartmented by baffles 37 to control the liquid level and lateral movement in the various tray sections.

Figure 7:
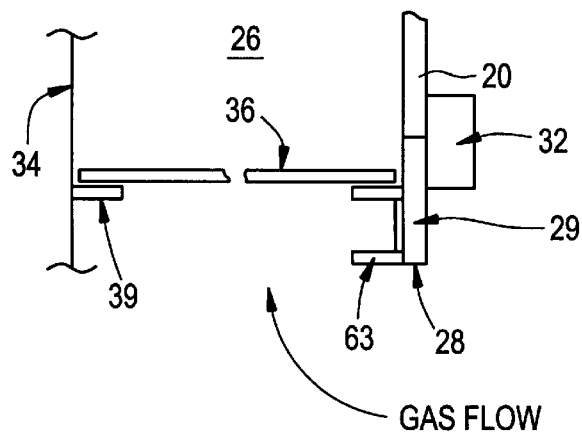
FIG. 7 is a sectional view taken at 7—7 in FIG. 6 and shows the preferred method of attaching the downcomer extension and the main support beam to the bottom of the downcomer extension.
Figure 8:
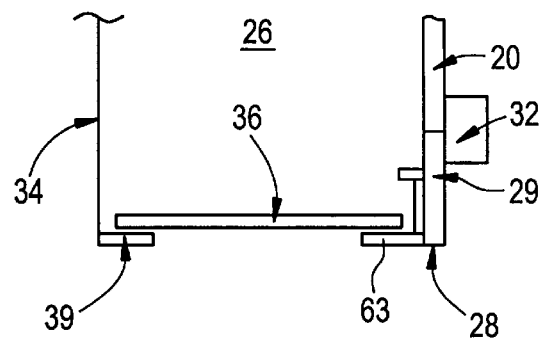
FIG. 8 is a view similar to FIG. 7, but shows an alternate method of attaching the main support beam to the downcomer.
Figure 9:
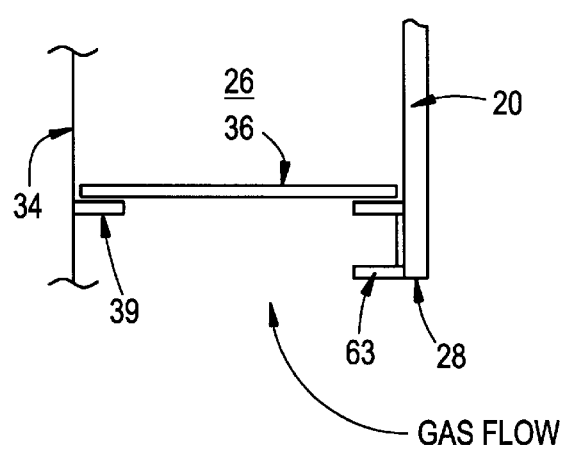
FIG. 9 also is a view similar to FIGS. 7 and 8, but shows an alternate method of attaching the main support beam at the bottom of the downcomer.
Figure 10:
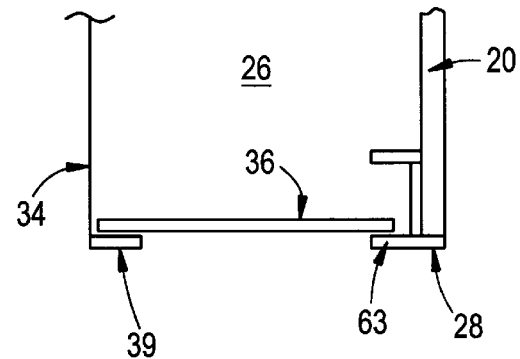
FIG. 10 is a view similar to FIGS. 7–9, but shows a further alternate method of attaching the main support beam at the bottom of the downcomer.
Figure 11:
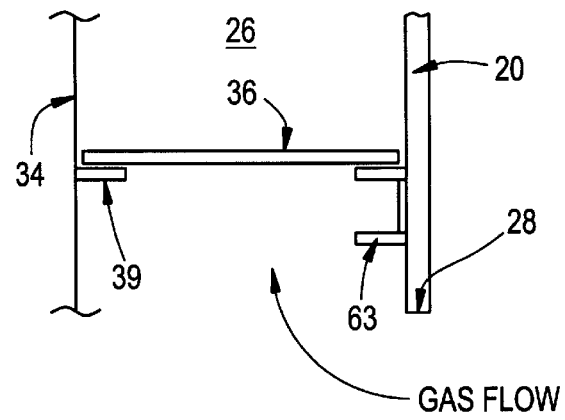
FIG. 11 is a view similar to FIGS. 7–10, but shows yet an alternate method of attaching the main support beam to the downcomer.
Figure 12:
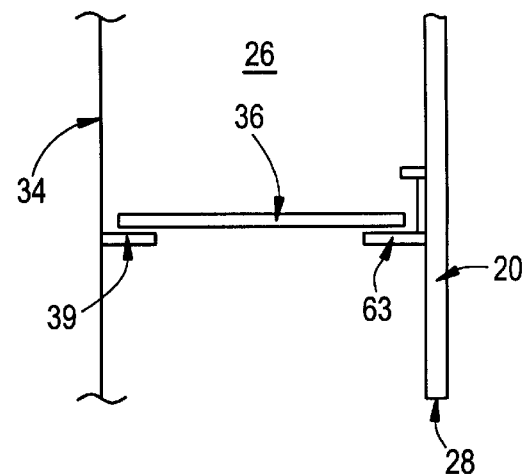
FIG. 12 is a view similar to FIGS. 7–11, but shows an still alternate method of attaching the main support beam to the downcomer.

FIG. 7 shows the attachment of extension 29 to the original downcomer 20 using internal gussets 32. The main support beam 63 is attached to the bottom 28 of the downcomer extension 29. The tray sections 36 are laid on top of the support beam 63. The tray sections may be welded to each other for support or may be bolted in place. A combination of both attachment methods is also possible to provide inspection access to the structures under the tray.

In FIG. 6, the porosity of the tray sections 36 is uniform across the annulus. The uniform porosity of the tray sections 36 could vary from about 15 to about 80% open surface area depending on the gas velocity leaving the downcomer, the extent of gas maldistribution, and the general operating conditions of the scrubber.

FIGS. 8, 9, 10, 11 and 12 show alternate methods of attaching the tray support structures to the existing structure of the scrubber.

Figure 13:
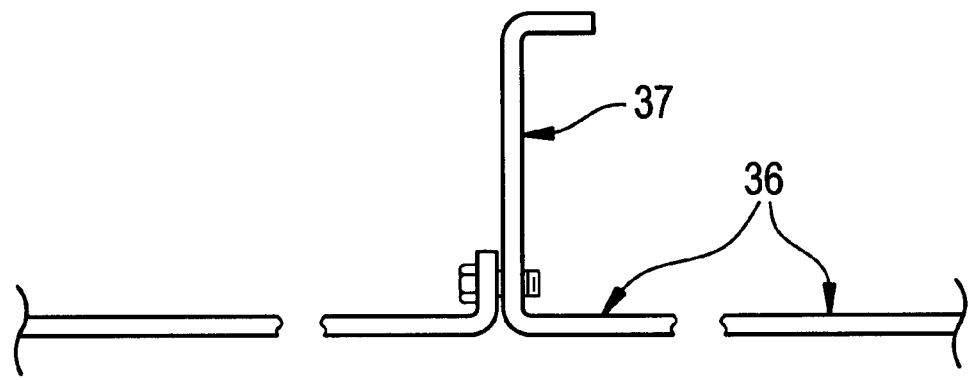
FIG. 13 is a view of side section XIII—XIII of FIG. 5, showing the tray baffle attachment to a tray section.

FIG. 13 shows a typical attachment of the tray section baffles 37 to the tray sections 36.

Figure 14:
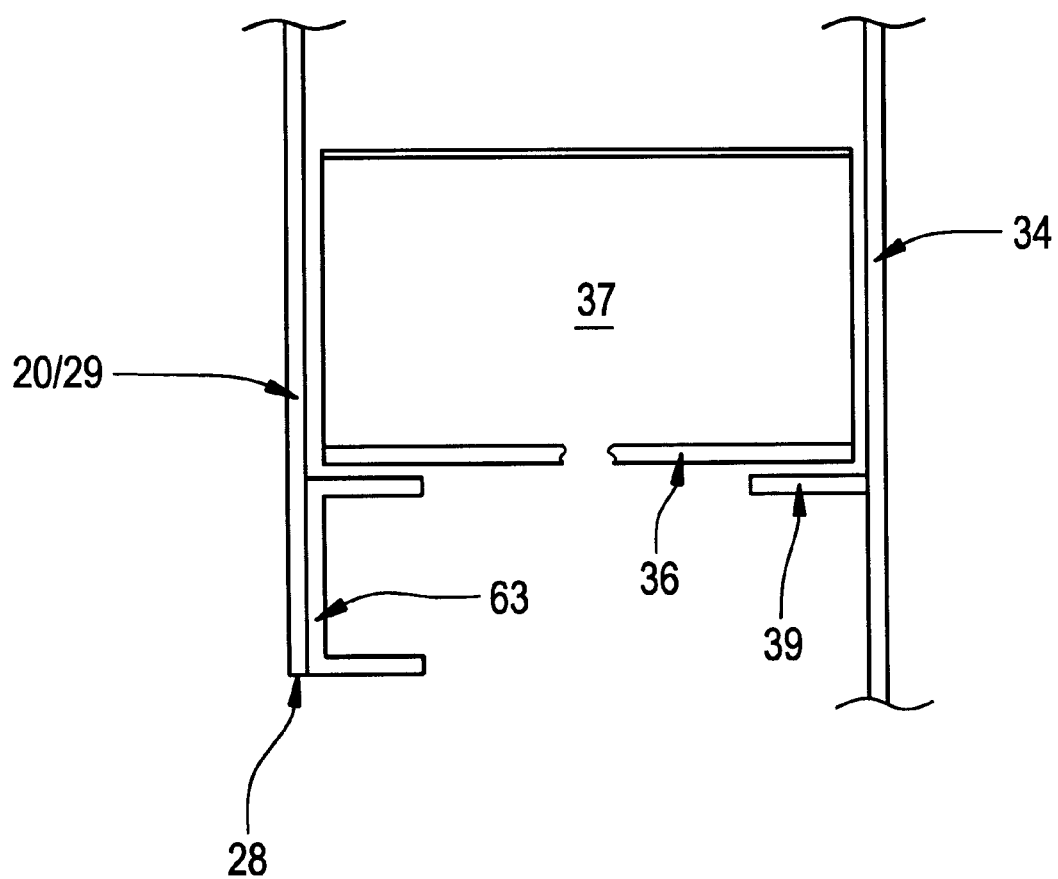
FIG. 14 is a side view of section XIV—XIV of FIG. 6, showing the attachment of the tray's ring support to the outer annulus wall.

FIG. 14 shows the support of the tray section 36 and the baffle plate 37 off the outer support ring 39 and the support beam 63 attached to the downcomer 20.

Figure 15:
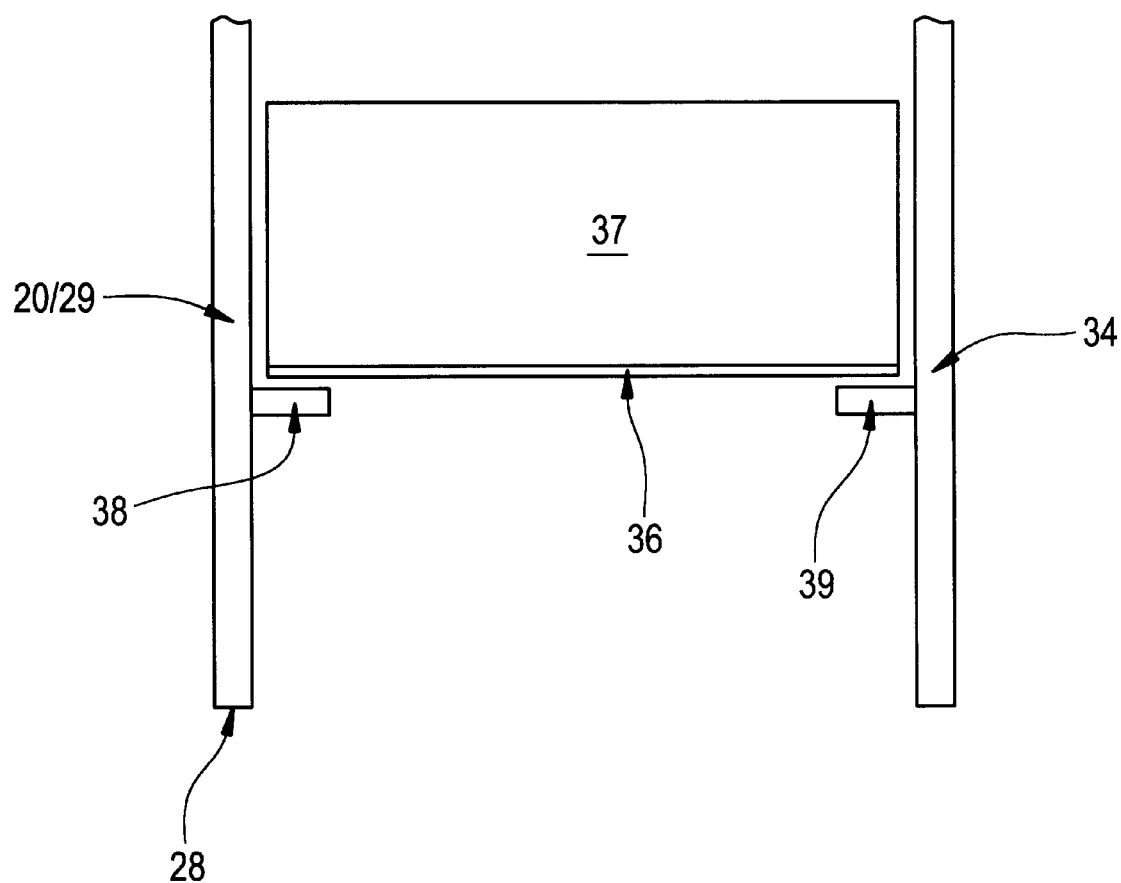
FIG. 15 is a side view of section XV—XV of FIG. 6, showing the tray support off the ring attached to the outer wall of the downcomer.

FIG. 15 shows the support of the tray sections 36 off the inner and outer support rings 38 and 39.

Figure 16:
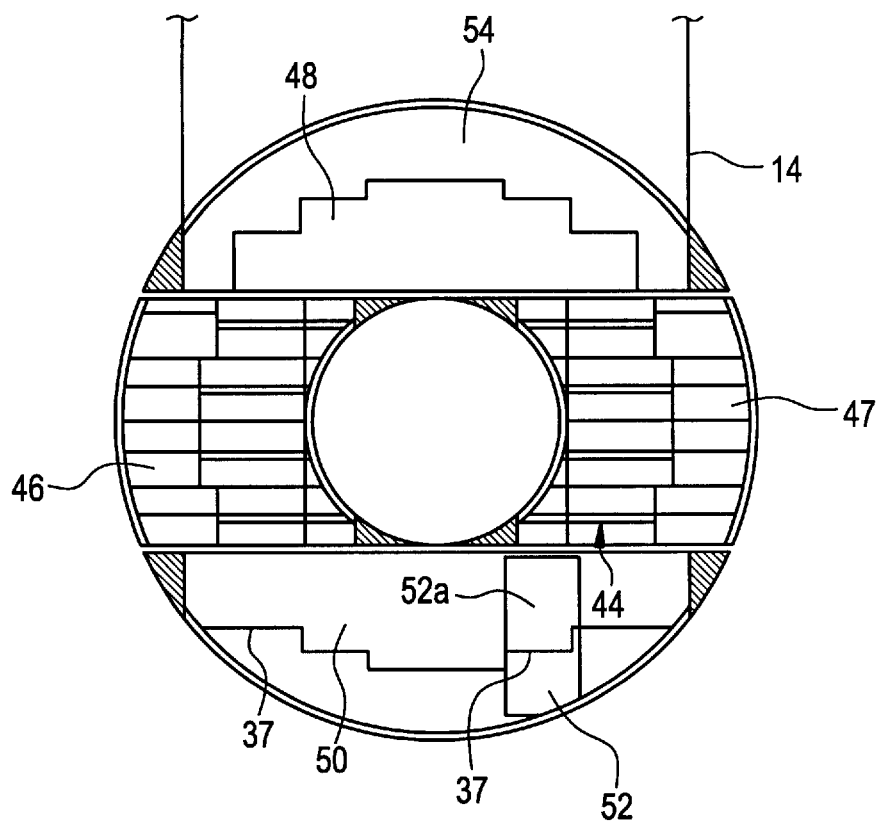
FIG. 16 shows an example of using variable area tray sections to control the gas flow.

FIG. 16 illustrates an alternate embodiment where different sections 36 of the perforated tray 40 have different porosity. For example, an inner set of tray sections 44 has a 35% opening or porosity while outer tray sections 46 have a 30 or 33% porosity. Inner tray sections 48 which is on the side of the outlet 14 may have a porosity of 33% while the symmetrically oriented tray sections 50 opposite from the outlet 14 has a greater porosity, for example 35%. In likewise fashion, the outer tray sections 52 away from the outlet 14 has a higher porosity, for example 33%, than the outer tray sections 54, which are located on the outlet side and has a porosity of about 28%. In FIG. 6, the porosity of the tray sections 36 is uniform across the annulus. The uniform porosity of the tray sections 36 could vary from about 15 to about 80% open area depending on the gas velocity leaving the downcomer, the extent of gas maldistribution, and the general operating conditions of the scrubber. The same section, for example tray section 52, may also have different porosities as shown in sections 52 and 52a of FIG. 16.

The asymmetry can also be from side to side with the section 46 on the downstream end of the annulus with respect to the rotation of the gases having a porosity of 30% while the upstream end 47 has a porosity of 33%. The porosity of the each tray section 36 could vary from about 15 to about 80% open area depending on the extent of gas maldistribution leaving the downcomer and the general operating conditions of the scrubber.

In this way, the porosity of the tray sections can be tailored to provide a custom velocity profile of the upwardly moving gases to avoid the differences in velocity and thus, differences in scrubbing effect which was experienced in the prior art as illustrated in FIG. 2.

The porosity of the tray could be varied by any one of the following means:

Use a one size hole in all tray segments and vary the number of holes per segment, thus changing the porosity of the various segments;

Use different sized holes in the various sections while maintaining the same number of holes per section of the tray to effect the desired variation in the tray section porosity; or Use a combination of the above two options, namely, using a different number and size of holes simultaneously.

The desirable range for tray section holes varies from about ¼ inch to as large as about 3 inches.

Figure 17:
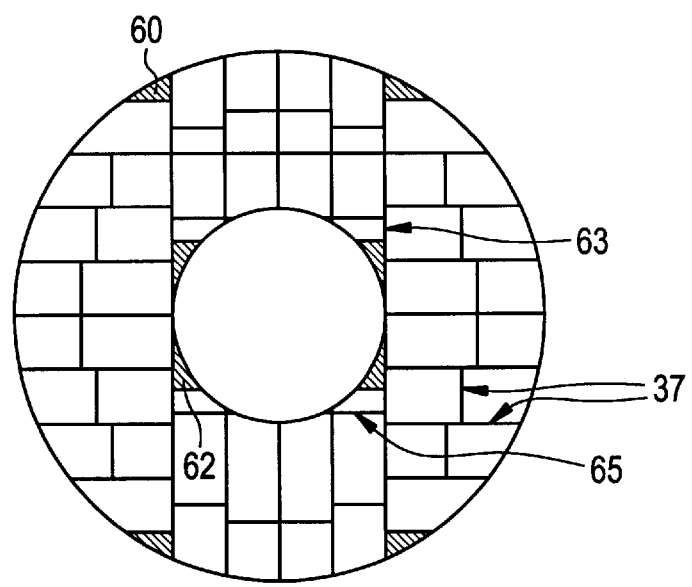
FIG. 17 shows the typical dimensions of the tray sections and additional nomenclature.

FIG. 17 illustrates blocked off areas in cross hatching which are distributed around the rectangular trays and tray sections. Outer blocked out areas are shown at 60 and inner blocked area are shown at 62. Each blocked area contains one or two holes for proper drainage of the falling liquid. FIG. 17 illustrates the location of the support channels 63, a typical baffle location 64 and the support bars 65. Support bars 65 act as span breakers to support the long tray sections. One or more support bars 65 may be located depending on the structural support requirements of the tray 40 and tray sections 36. All trays are advantageously the same width. The width of the tray section depends on the span between the support beams 63 and the width of the overall sector facing the outlet. The width of the tray section could vary from about 2'0" to 4'10", with a typical width of about 2'5". The unit length is about 7'11" made up of one full rectangular tray and at least one tray baffle 37.

Figure 18:
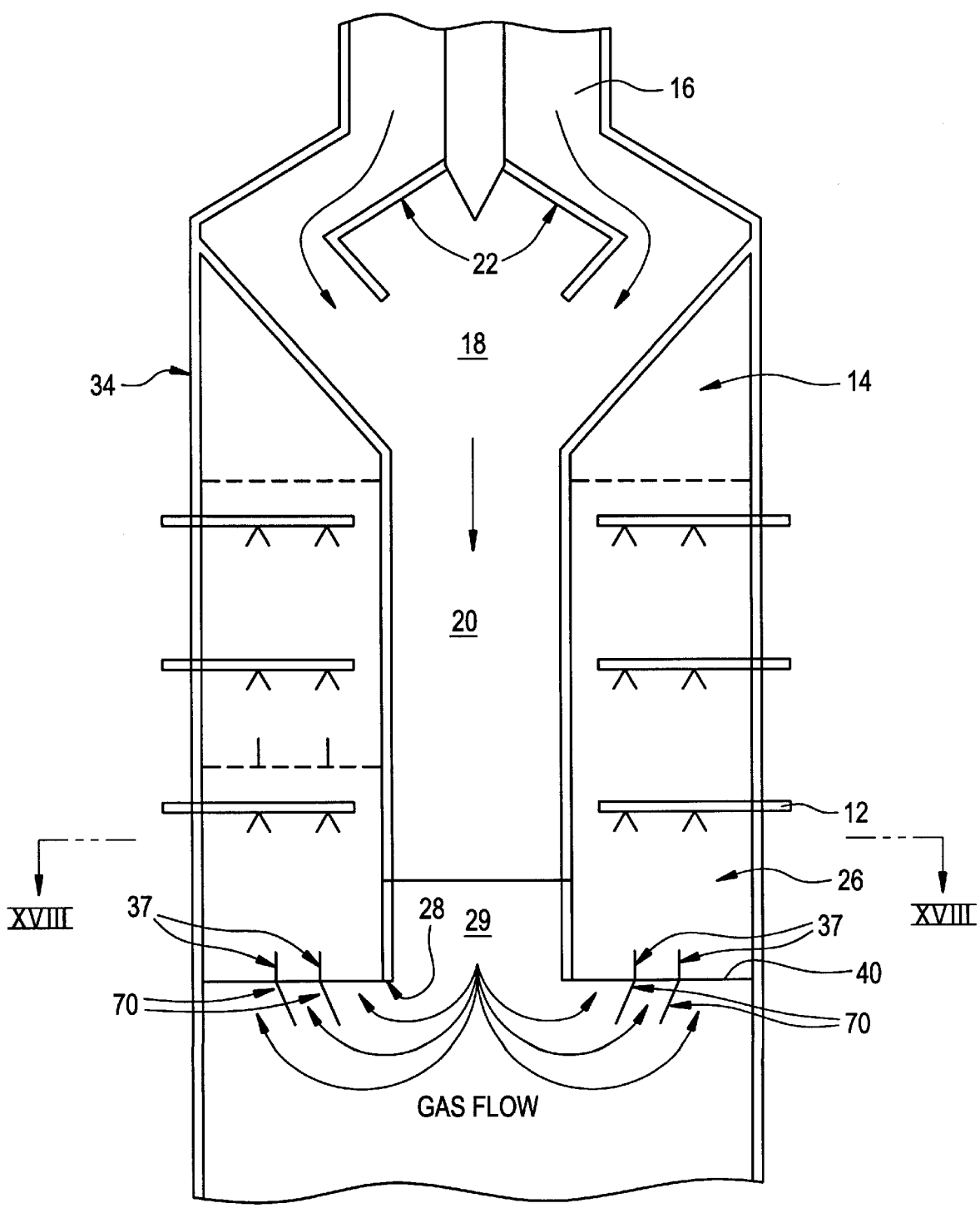
FIG. 18 illustrates the use of under tray turning vanes to assist in gas distribution.

FIG. 18 illustrates the location of turning vanes 70 which are located below the perforated tray and the baffles 37 which are above the tray. The baffles 37 could be located in line with the vanes 70 or offset from vanes 70. Vanes 70 are located between the support beams 63 and are bent inwardly to conform more closely to the flow of gases as they curve around the lower end of the downcomer.

Figure 19:
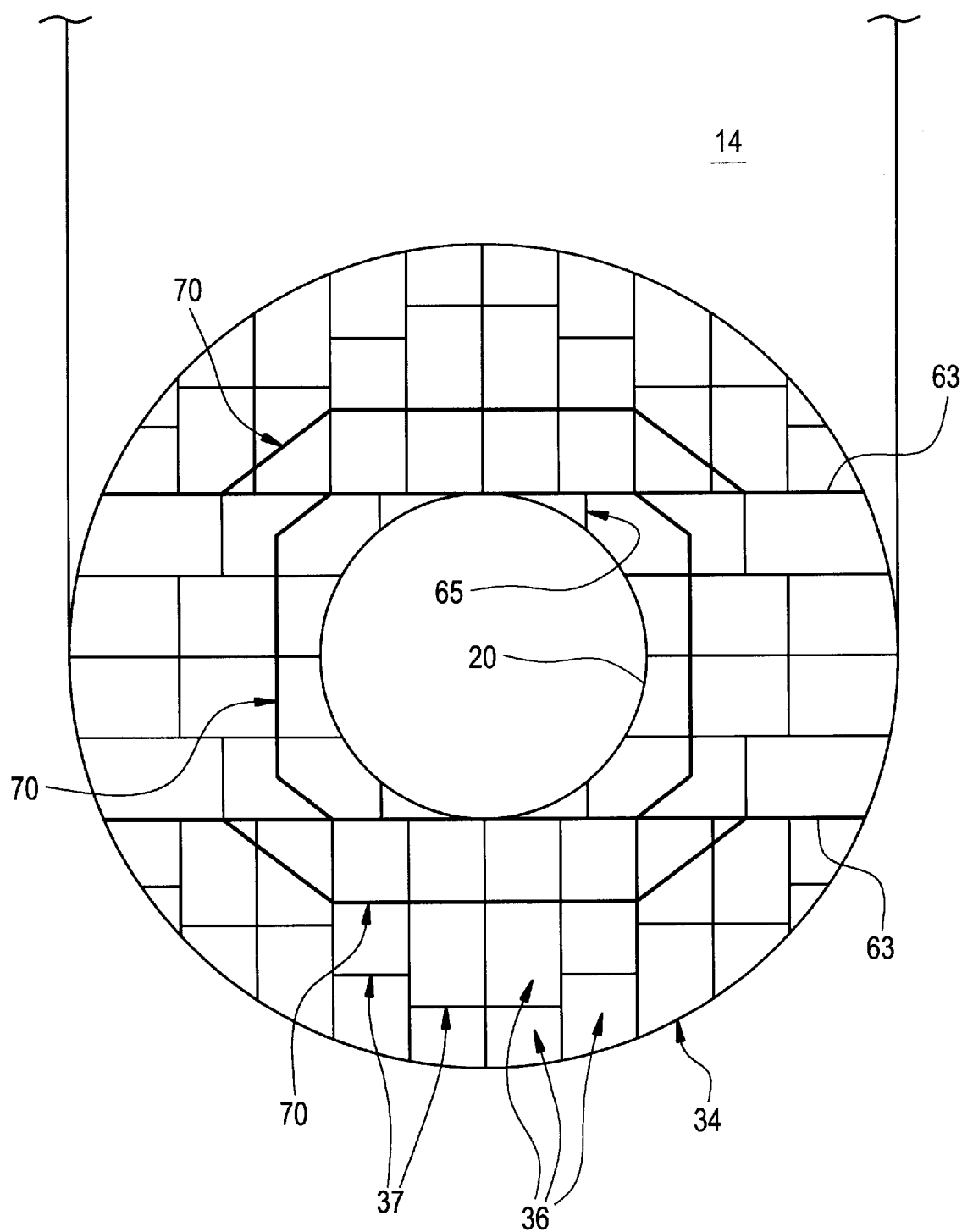
FIG. 19 shows a plan view of FIG. 18, taken at XVIII—XVIII showing the location of vanes relative to the main support beams and the support bars.

FIG. 19 illustrates the placement of the tray baffles 37 over a perforated tray and turning vanes 70 under the tray relative to the location of the main supports 63. In FIGS. 18 and 19 the vanes are located in line with the turning vanes 70. In other cases, the orientation of the baffles (above tray vanes) 37 may not line up with the under tray supports or vanes 70.

Figure 20:
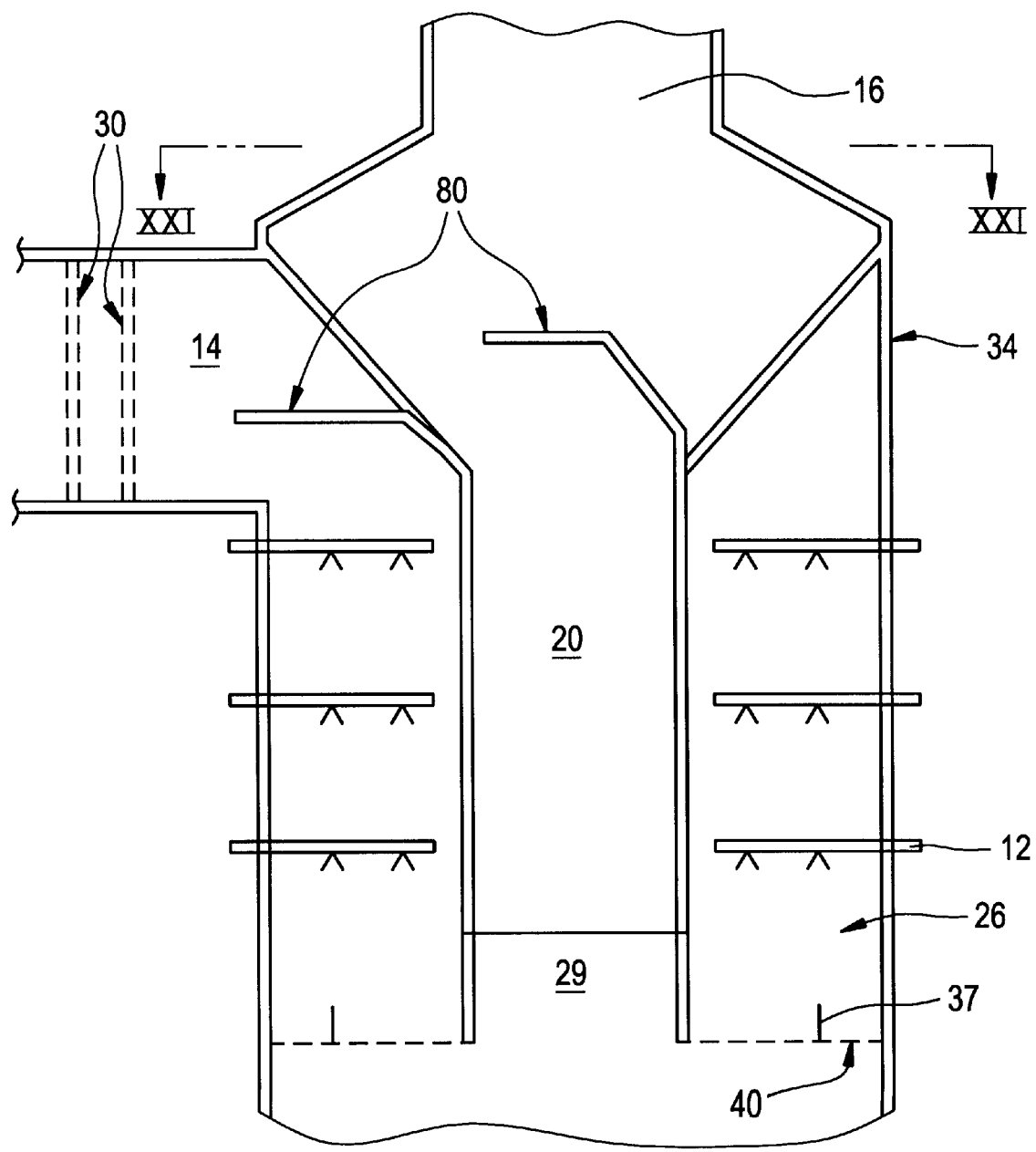
FIG. 20 shows the turning vanes located on top of the top spray header to improve gas distribution to the outlet and the mist elimination device.
Figure 21:
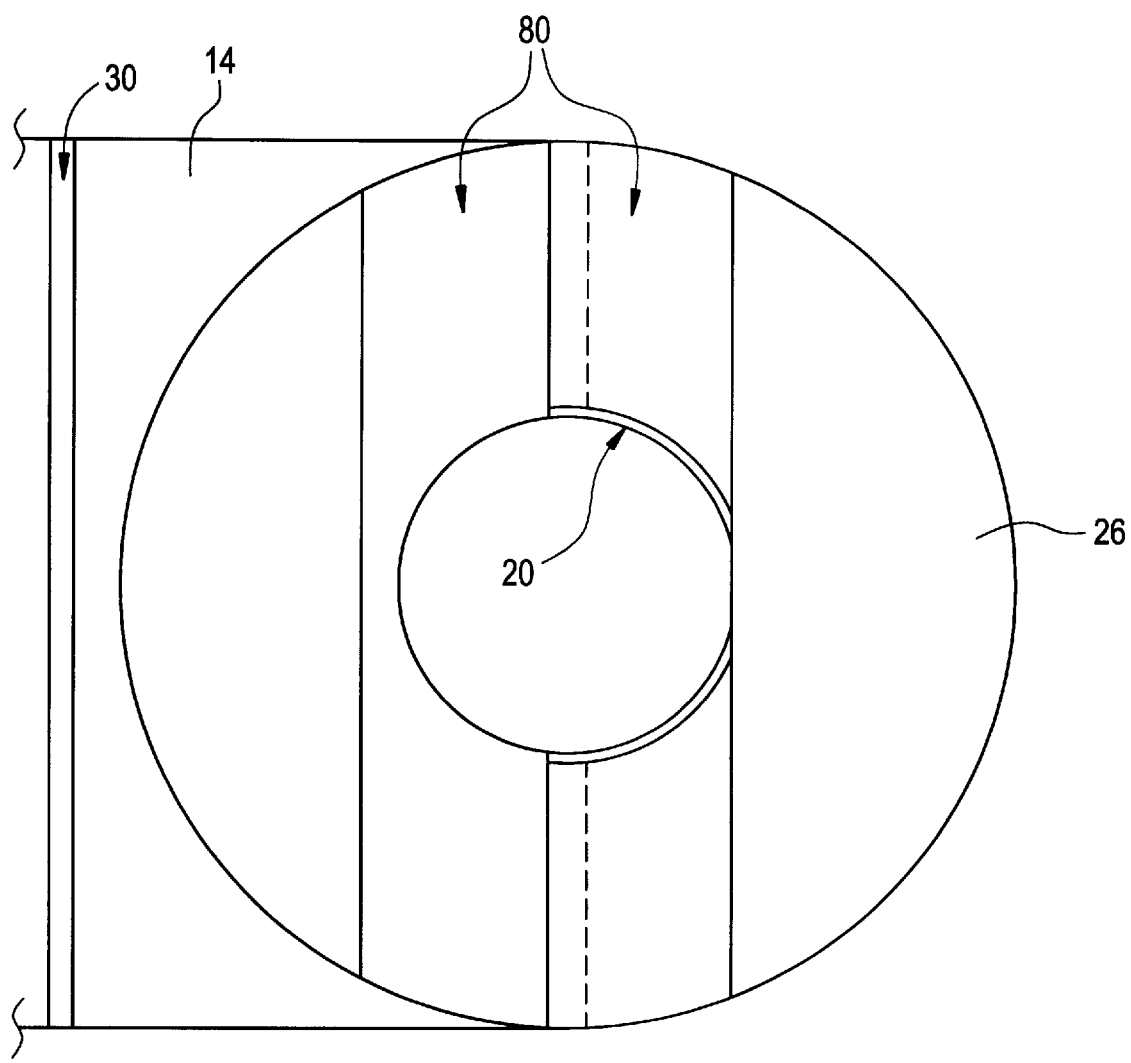
FIG. 21 shows a plan view of the top turning vanes shown in FIG. 20, taken at XX—XX.

FIGS. 20 and 21 show another embodiment of the invention using sloped turning vanes 80 at the upper annular section of the scrubber to provide even gas distribution into the outlet flue and the mist elimination device 30.

Figure 22:
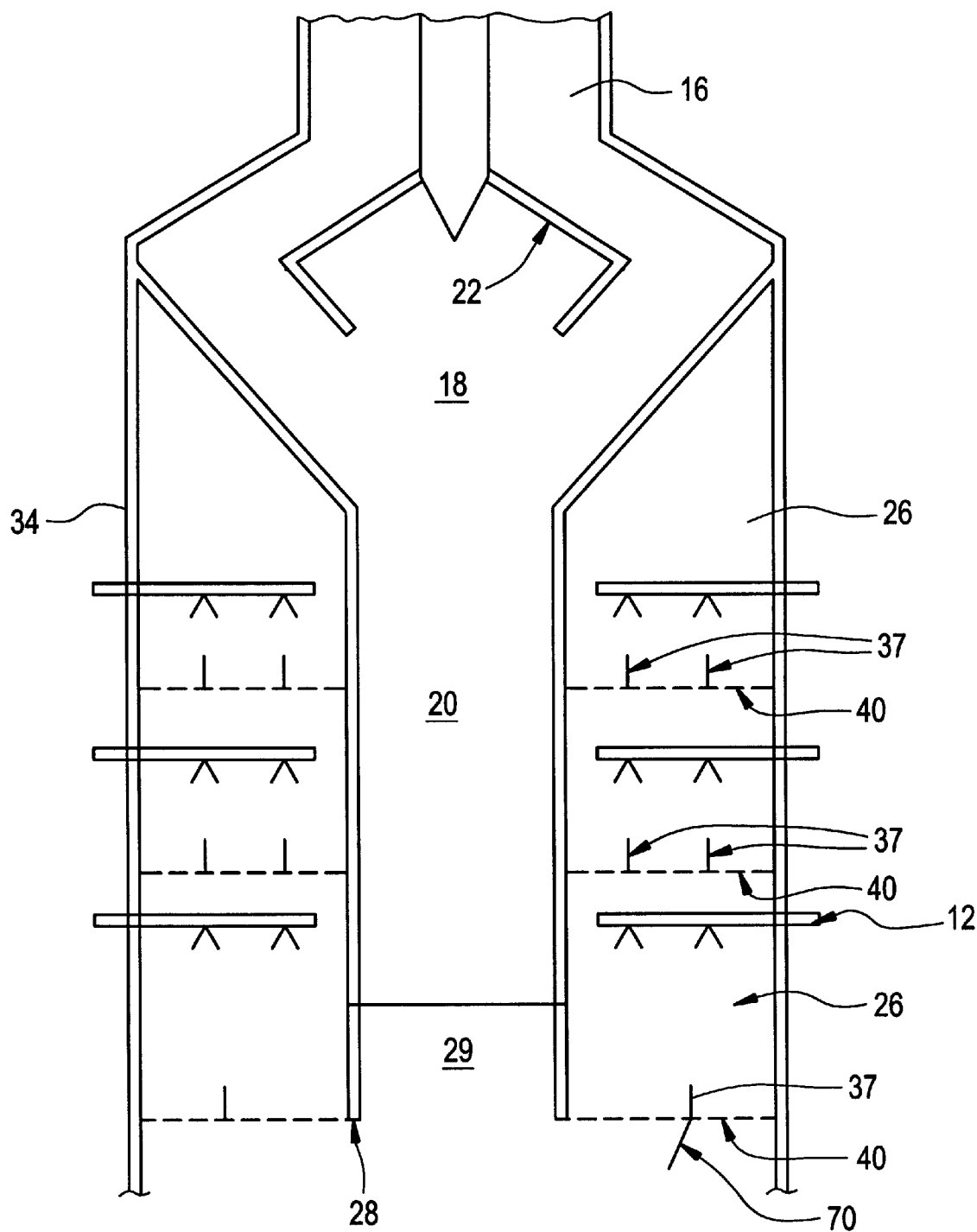
FIG. 22 is an alternate embodiment of the invention illustrating the use of multiple trays under the spray headers in the annulus.

One or more perforated tray 40 may be located under one or more spray header 12 in a single annulus enclosure 34 as needed to correct the gas distribution within the annulus and as dictated by the operating conditions. FIG. 22 is an illustration of locating multiple trays in a single annulus.

While specific embodiments of the invention have been shown and described in detail to illustrate the application of the principles of the invention, it will be understood that the invention may be embodied otherwise without departing from such principles.

What is claimed is:

1. A center inlet type scrubber having means defining an inlet for gases to be scrubbed, a venturi section in said inlet for controlling gas flow, humidifying gas flow, and for fly ash removal, a downcomer for receiving controlled gas from the venturi section and for directing the gas downwardly in the scrubber, means defining an annulus around the downcomer, means defining an outlet for gas near an upper end of the annulus, and a plurality of spray headers extending into the annulus for spraying scrubber solution in counter-current flow relationship with gases rising in the annulus, the improvement comprising:

a perforated tray under a lowest of the spray headers, said perforated tray having several sections, each section extending across at least part of said annulus for receiving gases rising in the annulus, therethrough and each section having a shape which is other than pie shaped;

means connected to said downcomer below the lowest spray header to extend the downcomer for positioning the tray and tray sections at a selected distance below the lowest spray header, the tray and an adjacent one of the spray headers forming a spray bank; and said perforated tray being connected across said annulus and from a lower end of said downcomer for distributing gases which turn from flowing downwardly in the downcomer to a path moving upwardly into said annulus.

2. A center inlet scrubber as recited in claim 1, wherein said downcomer extending means comprises a lower end of said downcomer which is situated about 18 inches to about 5 feet below said lowest spray bank.

3. A center inlet scrubber as recited in claim 2, wherein each tray section comprises a plurality of rectangular and partially rectangular trays assembled together to substantially fill a horizontal space in said annulus at the level of the tray.

4. A center inlet scrubber as recited in claim 3, further comprising a plurality of vertically and horizontally extending supports connected between an outer wall of the scrubber and the downcomer, each support being provided for supporting the tray sections.

5. A center inlet type scrubber as recited in claim 4, wherein said supports are above each tray section.

6. A center inlet type scrubber as recited in claim 4, wherein said supports are below each tray section.

7. A center inlet type scrubber as recited in claim 1, wherein the spray headers are spraying co-current to the gas flow.

8. A center inlet type scrubber as recited in claim 1, wherein each tray section comprises a plurality of rectangular and partially rectangular trays arranged to fill a horizontal space across said annulus at each tray section.

9. A center inlet type scrubber as recited in claim 8, further comprising baffles in each tray section to control liquid movement and level on top of the tray sections.

10. A center inlet type scrubber as recited in claim 8, further comprising supports under the tray sections for supporting the trays, the supports being shaped to turn and direct the gases evenly into the annulus.

11. A center inlet type scrubber as recited in claim 10, further comprising blocked out areas containing one or more holes for drainage, the holes being located near the downcomer and selected areas around the annulus enclosure.

12. A center inlet type scrubber as recited in claim 1, wherein each tray contains a plurality of rectangular and partially rectangular tray sections, the tray sections nearest the downcomer having greater porosity than tray sections spaced away from the downcomer.

13. A center inlet type scrubber as recited in claim 12, wherein at least some of the tray sections which are on a side of the annulus away from the outlet have greater porosity than tray sections which are on a side of the scrubber that is on a same side a the outlet.

14. A center inlet type scrubber as recited in claim 13, wherein the porosity of the tray sections are varied with a constant hole size and the number of holes per tray section are varied.

15. A center inlet type scrubber as recited in claim 1, wherein a porosity of the tray sections are maintained the same across all tray sections with a hole size of the tray sections ranging from about ¼ inch to about 3 inches.

16. A center inlet type scrubber as recited in claim 12, wherein the porosity of the tray sections are varied by maintaining a constant hole size in all the tray sections and varying a number of holes in said tray sections.

17. A center inlet type scrubber as recited in claim 12, wherein the porosity of the tray sections are changed varying the hole sizes in each tray section from about ¼ inch to about 3 inches and maintaining the same number of holes in each tray section.

18. A center inlet type scrubber as recited in claim 1, further comprising vanes connected to the perforated tray below a lower end of the downcomer and extending inwardly toward a center of the scrubber for helping to turn gases from the downcomer into the annulus.

19. A center inlet type scrubber as recited in claim 18, further comprising vanes or baffles disposed above the perforated tray for guiding gases into the annulus.

20. A center inlet type scrubber as recited in claim 1, further comprising turning vanes connected to the top of the downcomer and adjacent the outlet for turning gases into the outlet from the annulus.

21. A center inlet type scrubber having means defining an inlet for gases to be scrubbed, a venturi section in said inlet for controlling gas flow, humidifying gas flow, and for fly ash removal, a downcomer for receiving controlled gas from the venturi section and for directing the gas downwardly in the scrubber, means defining an annulus around the downcomer, means defining an outlet for gas near an upper end of the annulus, and a plurality of spray headers extending into the annulus for spraying scrubber solution in counter-current flow relationship with gases rising in the annulus, the improvement comprising:

a perforated tray under a lowest of said spray headers, said perforated tray having several sections, each section extending across at least part of said annulus for receiving gases rising in the annulus, therethrough and each section having a rectangular or partially rectangular shape to substantially fill a horizontal space in the annulus;

means connected to said downcomer below the lowest spray header to extend the downcomer for the purpose of locating the tray and tray sections at a distance of about 18 inches to about 5 feet below the lowest spray header, the tray and an adjacent one of the spray headers forming a spray bank; and said perforated tray being connected across said annulus and from a lower end of said downcomer for distributing gases which turn from flowing downwardly in the downcomer to a path moving upwardly into said annulus.

* * * * *